(12) United States Patent
Watanabe

(10) Patent No.: US 7,429,918 B2
(45) Date of Patent: Sep. 30, 2008

(54) VEHICLE LIGHTING SYSTEM

(75) Inventor: Takao Watanabe, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 161 days.

(21) Appl. No.: 11/142,419

(22) Filed: Jun. 2, 2005

(65) Prior Publication Data

US 2005/0275562 A1   Dec. 15, 2005

(30) Foreign Application Priority Data

Jun. 11, 2004   (JP)   ............ P.2004-174475

(51) Int. Cl.
  *B60Q 1/26*   (2006.01)
  *F21V 23/04*  (2006.01)
  *G06F 7/00*   (2006.01)

(52) U.S. Cl. .............. 340/468; 362/283; 362/284; 362/319; 362/324; 362/276; 362/264; 362/466; 701/36; 348/148; 348/149

(58) Field of Classification Search .............. None
See application file for complete search history.

(56) References Cited

U.S. PATENT DOCUMENTS

| 5,588,733 | A | * | 12/1996 | Gotou ............ 362/37 |
| 5,938,319 | A | | 8/1999 | Hege |
| 6,040,766 | A | | 3/2000 | Lubke et al. |
| 6,293,686 | B1 | | 9/2001 | Yayami et al. |
| 6,343,869 | B1 | | 2/2002 | Kobayashi |
| 6,459,387 | B1 | | 10/2002 | Kobayashi et al. |
| 6,969,183 | B2 | * | 11/2005 | Okubo et al. ......... 362/466 |
| 2004/0105264 | A1 | * | 6/2004 | Spero ................ 362/276 |
| 2005/0218298 | A1 | * | 10/2005 | Bechtel et al. .......... 250/208.1 |
| 2006/0018511 | A1 | * | 1/2006 | Stam et al. ............ 382/104 |

FOREIGN PATENT DOCUMENTS

| DE | 195 30 008 A1 | 2/1997 |
| DE | 694 01 792 T2 | 2/1997 |
| DE | 0 780 823 A1 | 6/1997 |
| DE | 197 13 884 A1 | 10/1998 |
| DE | 197 56 574 A1 | 10/1998 |
| DE | 197 37 653 A1 | 3/1999 |
| DE | 198 02 595 A1 | 7/1999 |
| DE | 100 07 984 A1 | 11/2000 |
| DE | 100 50 741 A1 | 4/2001 |
| DE | 100 05 795 C2 | 8/2001 |
| DE | 101 30 809 A1 | 1/2003 |
| DE | 101 51 514 A1 | 4/2003 |
| DE | 102 27 170 A1 | 1/2004 |
| DE | 103 36 681 B4 | 3/2005 |
| JP | 2001-325817 A | 11/2001 |
| JP | 2001001832 A | * 1/2007 |

* cited by examiner

*Primary Examiner*—Julie Lieu
(74) *Attorney, Agent, or Firm*—Sughrue Mion, PLLC

(57) ABSTRACT

A vehicle lighting system for illuminating ahead of a vehicle is provided with a plurality of light sources each adapted to illuminate a different illumination area to thereby form a predetermined light distribution pattern as a whole and a control unit for determining a traffic scene in which the vehicle is running and independently changing at least either an orientations or the light quantities of the plurality of light sources so as to form a target light distribution pattern which has been set in advance for the traffic scene.

15 Claims, 18 Drawing Sheets

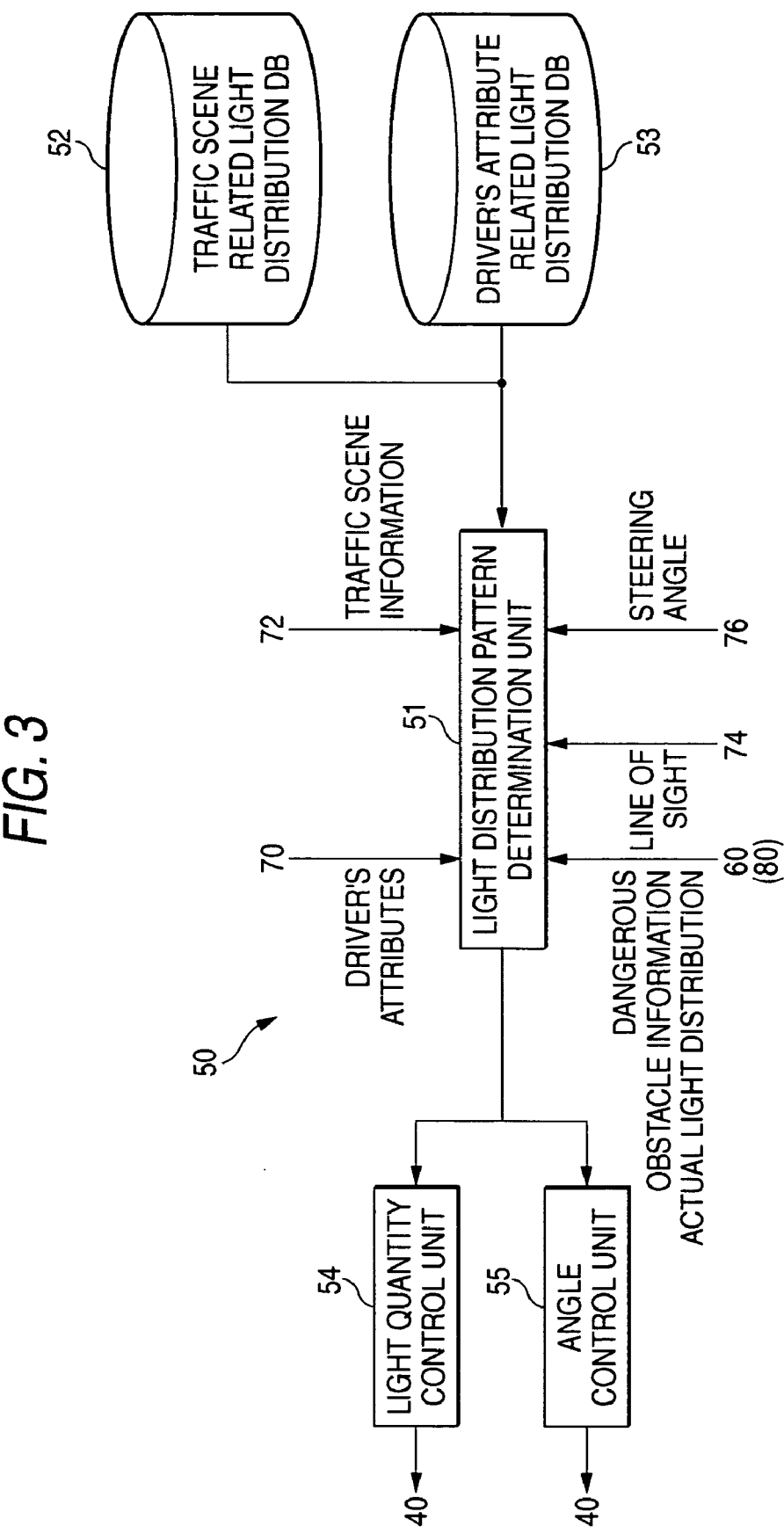

FIG. 4

TRAFFIC SCENE RELATED LIGHT
DISTRIBUTION DATA BASE 52

| COUNTRY/ REGION | TYPES OF ROADS, WEATHER | | LIGHT DISTRIBUTION PATTERNS |
|---|---|---|---|
| JAPAN, ENGLAND | HIGHWAY | RECTILINEAR COURSE | a |
| | | CURVILINEAR COURSE | b |
| | SUBURB | RECTILINEAR COURSE | c |
| | | CURVILINEAR COURSE | d |
| | URBAN AREA | RECTILINEAR COURSE | e |
| | | CURVILINEAR COURSE | f |
| | | INTERSECTION | g |
| | | RAINY WEATHER | h |
| FRANCE, GERMANY, USA ⋮ | HIGHWAY | RECTILINEAR COURSE | a INVERSION |
| | | CURVILINEAR COURSE | b INVERSION |
| | SUBURB | RECTILINEAR COURSE | c INVERSION |
| | | CURVILINEAR COURSE | d INVERSION |
| | URBAN AREA | RECTILINEAR COURSE | e INVERSION |
| | | CURVILINEAR COURSE | f INVERSION |
| | | INTERSECTION | g INVERSION |
| | | RAINY WEATHER | h INVERSION |

FIG. 5

| AGE | LIGHT DISTRIBUTION PATTERNS |
|---|---|
| 70 AND OLDER | NEAR FIELD, WIDE ANGLE |
| 60 AND OLDER BUT NOT OLDER THAN 70 | SEMI-NEAR FIELD, SEMI-WIDE ANGLE |
| NOT OLDER THAN 60 | STANDARD |

DRIVERS ATTRIBUTE RELATED
LIGHT DISTRIBUTION DATA BASE

VEHICLE LIGHTING SYSTEM

The present application claims foreign priority based on Japanese Patent Application No. P.2004-174475, filed on Jun. 11, 2004, the contents of which are incorporated herein by reference.

BACKGROUND OF THE INVENTION

1. Field of the Invention

The present invention relates to a vehicle lighting system, and more particularly, the invention relates to a vehicle lighting system which changes the forward illumination during running.

2. Related Art

JP-A-2001-325817 discloses a technique for illuminating a direction in which an automotive vehicle turns by directing light sources of headlamps of the automotive vehicle towards the direction in which the vehicle is steered to make such a turn.

In the technique, however, areas other than an area in the direction in which the vehicle is steered cannot be illuminated accurately according to the running conditions of the vehicle.

SUMMARY OF THE INVENTION

In accordance with one or more embodiments of the present invention, a vehicle lighting system for illuminating ahead of a vehicle is provided with a plurality of light sources each adapted to illuminate a different illumination area to thereby form a predetermined light distribution pattern as a whole and a control unit for determining a traffic scene in which the vehicle is running and changing independently the orientation of each of the plurality of light sources so as to form a target light distribution pattern which has been set in advance for the traffic scene.

In accordance with one or more embodiments of the present invention, the control unit may change the outline of the light distribution pattern by changing the orientation of each of the plurality of light sources only by a different rotating vector.

In accordance with one or more embodiments of the present invention, the vehicle lighting system may include further a camera for taking a photo ahead of the vehicle, and the control unit may determine the traffic scene from an image obtained by the camera.

In accordance with one or more embodiments of the present invention, the vehicle lighting system may include further a position recognition unit for recognizing a country or region as the traffic scene, and the control unit may form the target light distribution pattern according to a country or region obtained from the position recognition unit.

In accordance with one or more embodiments of the present invention, the vehicle lighting system may include further a road type recognition system for recognizing the type of a road as the traffic scene based on a current position, and the control unit may change independently the orientation of each of the plurality of light sources so as to cause the orientation of each of the plurality of light sources to converge on a farther and narrower area than when running on a normal road, in the event that the type of the road obtained from the road type recognition unit indicates a highway.

In accordance with one or more embodiments of the present invention, the vehicle lighting system may include further a road type recognition system for recognizing the type of a road as the traffic scene based on a current position, and the control unit may change independently the orientation of each of the plurality of light sources so as to cause the orientation of each of the plurality of light sources to diverge towards a wider area than when running on a suburban road, in the event that the road type recognition unit recognizes the current road as an urban road.

In accordance with one or more embodiments of the present invention, the vehicle lighting system may include further a camera for taking a photo ahead of the vehicle, and the control unit may obtain an actual light distribution pattern from an image photographed by the camera and then causes the actual light distribution pattern to coincide with the target light distribution pattern by changing the orientation of the plurality of light sources.

In accordance with one or more embodiments of the present invention, the vehicle lighting system may include further a camera for taking a photo ahead of the vehicle, and the control unit may determine the brightness on the road on which the vehicle is traveling ahead from an image obtained by the camera, so that a shoulder of the road is then illuminated by at least part of the plurality of light sources, in the event that the control unit determines that the brightness on the road is at a predetermined value or greater.

In accordance with one or more embodiments of the present invention, the vehicle lighting system may include further a camera for taking a photo ahead of the vehicle, and the control unit may detect a dark area whose brightness is at a predetermined value or smaller from an image obtained by the camera, so that the dark area is illuminated by at least part of the plurality of light sources.

In accordance with one or more embodiments of the present invention, the control unit may swing the illuminating direction of each of the plurality of light sources, so that a boundary between adjacent illumination areas is illuminated.

Note that while the invention has been summarized above, not all required features have been enumerated and that sub-combinations of some of the group of features can also constitute the invention.

Other aspects and advantages of the invention will be apparent from the following description and the appended claims.

BRIEF DESCRIPTION OF THE DRAWINGS

FIG. 3 is a block diagram illustrating the functional configuration of a light sources control unit.

FIG. 4 is a drawing illustrating an example of a data format of a traffic scene related light distribution data base.

FIG. 5 is a drawing illustrating an example of a data format of a driver's attribute light distribution data base.

REFERENCE NUMERALS AND CHARACTERS

20: vehicle; 30: vehicle lighting system; 40: light source; 42: LED element; 44: substrate; 46: yoke; 48: landing portion; 50: light sources control unit; 51: light distribution pattern determination unit; 52: traffic scene related light distribution data base; 53: driver's attribute related light distribution data base; 54: light quantity control unit; 55: angle control unit; 60: forward conditions determination unit; 62: camera; 64: actual light distribution obtaining unit; 66: dangerous obstacle determination unit; 68: radar; 70: driver authentication unit; 72: navigation unit; 74: line of sight detection unit; 76: steering angle obtaining unit; 78: running control unit; 80: communication unit; 400: left headlight; 410: left auxiliary light; 420: right headlight; 430: right auxiliary light.

DESCRIPTION OF THE PREFERRED EMBODIMENTS

While the invention will be described through an embodiment of the invention below, an embodiment described below is not such as to limit an invention claimed, and all possible combinations of features that will be described in the embodiment will not constitute inevitable means for attaining the invention.

Figure 1:
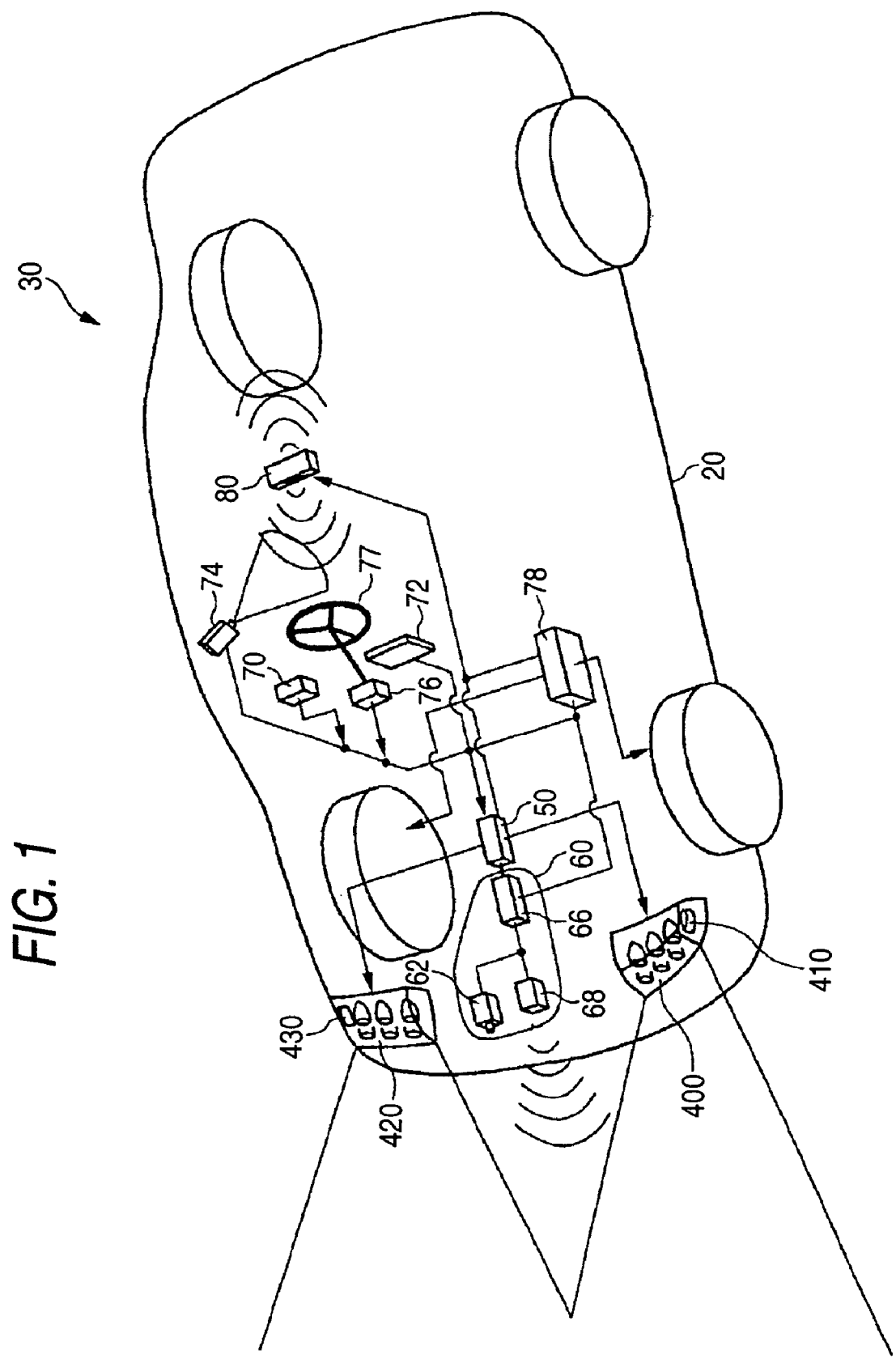
FIG. 1 is a conceptual drawing of a vehicle lighting system installed on a vehicle.
Figure 2:
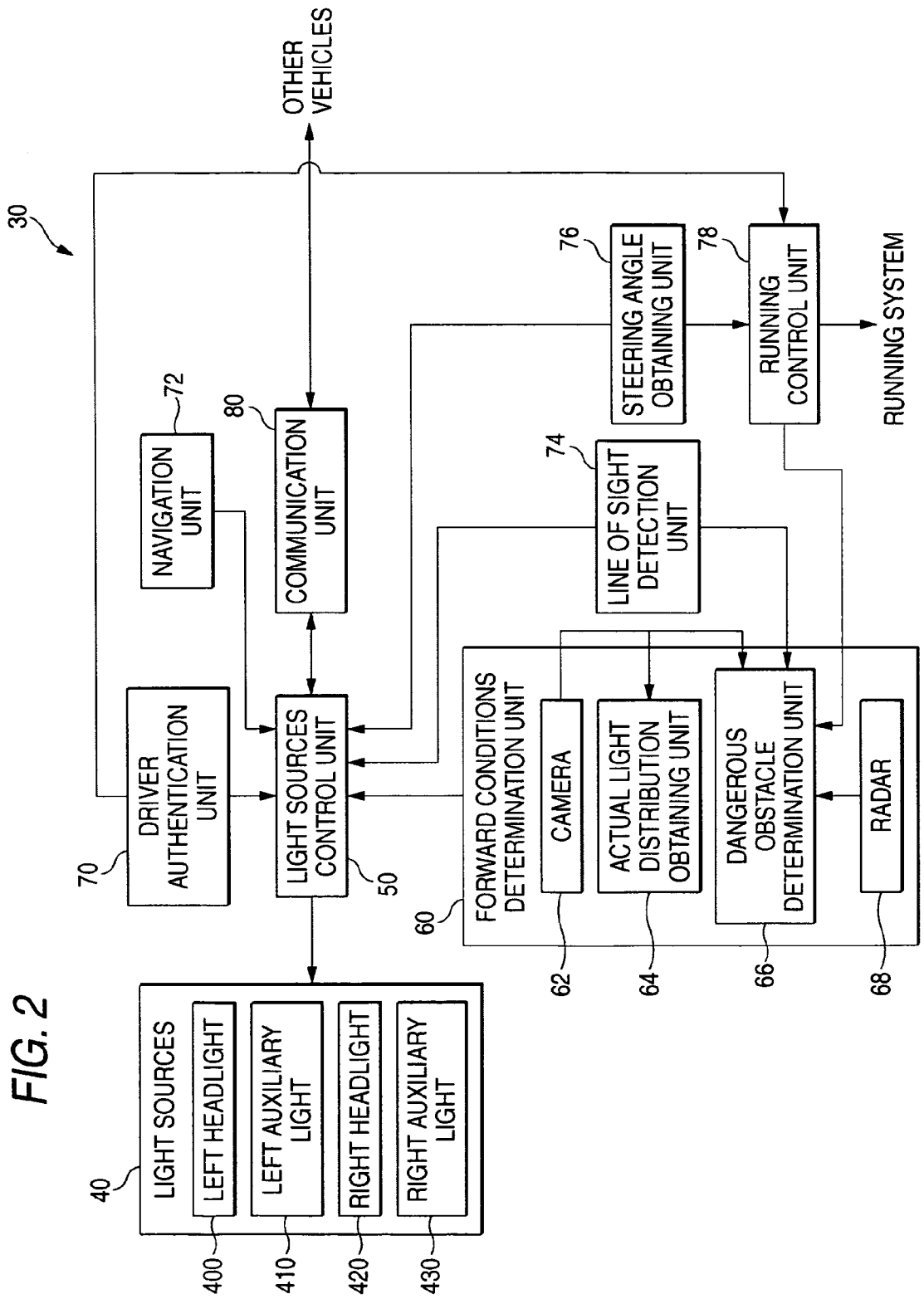
FIG. 2 is a block diagram showing the functional configuration of the vehicle lighting system.

FIGS. 1 and 2 illustrate the configuration of a vehicle lighting system 30 according to an embodiment of the invention. FIG. 1 shows a conceptual layout of the vehicle lighting system 30 installed on a vehicle 20. FIG. 2 shows a functional configuration of the vehicle lighting system 30 in the form of a block diagram. The vehicle lighting system 30 according to the embodiment is intended to make the driver feel safe and to improve the running safety by controlling the illumination according to the environment and state in which the vehicle 20 is driven and the state of the driver.

The vehicle lighting system 30 includes a plurality of light sources 40, a forward conditions determination unit 60, a navigation unit 72 and a light sources control unit 50. The plurality of light sources 40 are each adapted to illuminate a different illumination area to thereby form a predetermined light distribution pattern as a whole. Part of the plurality of light sources 40 constitute at the left front of the vehicle a left headlight 400 and a left auxiliary light 410 and at the right front thereof a right headlight 420 and a right auxiliary light 430.

The forward conditions determination unit 60 determines road conditions ahead of the vehicle 20. The forward conditions determination unit 60 includes a camera 62, an actual light distribution obtaining unit 64, a dangerous obstacle determination unit 66 and a radar 68. The camera 62 photographs ahead of the vehicle 20. The camera 62 photographs an infrared image ahead of the vehicle 20 when the surroundings are dark such as at night. The dangerous obstacle determination unit 66 determines an object which is likely to be hit by the vehicle as a dangerous obstacle based on an image obtained by the camera or information obtained by the radar 68. The navigation unit 72 constitutes an example of a position recognition unit and a road type recognition unit of the invention. Namely, the navigation unit 72 recognizes a country or region where the vehicle 20 is running based on the current position thereof and also recognizes the type of the road on which the vehicle 20 is running.

A driver authentication unit 70 authenticates the driver to an ignition system when the driver attempts to start the engine. The driver authentication unit 70 authenticates the driver via a biometrics authentication or an authentication adopting ID card reading. When the biometrics authentication is used, a physical feature such as the finger print or iris of the driver who is to be permitted to drive the vehicle 20 is registered in advance at the driver authentication unit 70 together with information on his or her driving license and age. Then, a running control unit 78 may be permitted to start the engine on conditions that the physical feature of the driver coincides with the physical feature that has been registered in advance. The running control unit 78 controls the rotational speed of the engine and steering. A steering angle obtaining unit 76 obtains a steering angle from the rotation of a steering wheel 77 and outputs the steering angle so obtained to the running control unit 78. The steering angle obtaining unit 76 also outputs the obtained steering angle to the light sources control unit 50, as well.

A line of sight detection unit 74 photographs the face of the driver from the front and calculates a direction of the line of sight from the orientation of the face and centers of the pupils of the driver. Then, the line of sight detection unit 74 informs the light sources control unit 50 of the direction of the line of sight so calculated. A communication unit 80 communicates with vehicles running near the vehicle 20. The communication unit 80 obtains information on a dangerous obstacle that has been obtained by vehicles near the vehicle 20 or, in particular, a leading vehicle and informs the light sources control unit 50 of the information so obtained. Furthermore, the communication unit 80 also informs a following vehicle of information on a dangerous obstacle which is so determined by the dangerous obstacle determination unit.

The light sources control unit 50 obtains information indicating the running environment and the state of the driver from the driver authentication unit 70, the navigation unit 72, the communication unit 80, the steering angle obtaining unit 76, the line of sight detection unit 74 and the forward conditions determination unit 60 and changes the orientation and quantity of light of each of the plurality of light sources 40. Consequently, in the event that the running environment and the state of the driver change, an optimal light distribution can be realized every time such a change occurs.

FIG. 3 is a block diagram illustrating a functional configuration of the light sources control unit 50. The light sources control unit 50 has a light distribution determination unit 51, a traffic scene related light distribution data base 52, a driver's attribute related light distribution data base 53, a light quantity control unit 54 and a angle control unit 55. The traffic scene related light distribution data base 52 records therein appropriate light distribution patterns according to traffic scenes represented by the types of roads and weather in such a manner as to relate the appropriate light distribution patterns to the traffic scenes, respectively. The driver's attribute related light distribution data base 53 records therein appropriate light distribution patterns according to attributes of the driver such as age and driving experience in such a manner as to relate the appropriate light distribution patterns to the attributes of the driver, respectively. Note that light distribution patterns recorded in the traffic scene related light distribution data base 52 and the driver's attribute related light distribution data base 53 include a range within which light is emitted and a light quantity distribution within the range.

The light distribution determination unit 51 obtains information which specifies a traffic scene from the navigation unit 72 and obtains from the traffic scene related light distribution data base 52 a light distribution pattern according to the traffic scene so obtained. The light distribution pattern determination unit 51 may determine a traffic scene from an image ahead of the vehicle 20 obtained by the forward conditions determination unit 60 and obtain a light distribution pattern according to the traffic scene so determined from the traffic scene related light distribution data base 52. For example, the light distribution pattern determination unit 51 determines whether the road on which the vehicle 20 is running is either a normal road or a highway from the existence of a footway along the road and the width of the lane on which the vehicle 20 is running. In addition, the light distribution pattern determination unit 51 recognizes a forward curve or an intersection and calculates a distance thereto.

Furthermore, the light distribution pattern determination unit 51 obtains an attribute of the driver from the driver authentication unit 70 and obtains a light distribution pattern according to the attribute of the driver so obtained from the driver's attribute related light distribution data base 53. The light distribution pattern determination unit 51 determines a light distribution pattern which corresponds to both the traffic scene and the driver's attribute by correcting the traffic scene dependent light distribution pattern by the drive's attribute dependent light distribution pattern. The angle control unit 55 realizes the light distribution pattern determined by the light distribution pattern determination unit 51 by changing the orientation of each of the plurality of light sources 40 only by a different rotating vector. The light quantity control unit 54 realizes an appropriate light quantity distribution within the light distribution pattern determined by the light distribution pattern determination unit 51 by independently changing the quantity of light of each of the plurality of light sources 40.

In addition, the light distribution pattern determination unit 51 obtains information on dangerous obstacles from the forward conditions determination unit 60 and the communication unit 80 as required during running and also obtains as required a line of sight of the driver and a steering angle of the steering wheel from the line of sight detection unit 74 and the steering angle obtaining unit 76, respectively. The light distribution pattern determination unit 51 changes a light distribution pattern in a real time fashion in such a manner as to illuminate the dangerous obstacle, the direction of the line of sight of the driver and the direction in which the steering wheel 77 is turned, respectively. Then, the angle control unit 55 and the light quantity control unit 54 change independently the orientation and light quantity of each of the plurality of light sources 40 in order to realize the light distribution pattern determined by the light distribution pattern determination unit 51, whereby the vehicle lighting system 30 can realize light distribution patterns which illuminate, respectively, the dangerous obstacle, the direction of the line of sight of the driver and the direction in which the steering wheel 77 is turned.

FIG. 4 illustrates an example of a data format of the traffic scene related light distribution data base 52. The traffic scene related light distribution data base 52 records therein appropriate light distribution patterns according to traffic scenes represented by the types of roads and weather in such a manner as to relate the appropriate light distribution patterns to the traffic scenes, respectively. For example, in the example shown in FIG. 4, there are three types of roads as the classification of traffic scene; a highway, a suburban road and an urban road. The highway and the suburban road are each classified into rectilinear and curvilinear courses. In addition, the urban area has, in addition to the rectilinear and curvilinear courses, an intersection as another type of road and a rainy weather as a category of weather. An ideal light distribution pattern is allocated to each type of road. For example, a light distribution pattern (a) allocated to the rectilinear course of the highway is a light distribution pattern in which the orientation of each of the plurality of light sources 40 is caused to converge on an upper and narrower area than a light distribution pattern (e) allocated to the rectilinear course of the urban road by changing independently the orientation of each of the plurality of light sources 40. Outlines of light distribution patterns will be described later on by reference to FIG. 9.

The traffic scene related light distribution data base 52 uses further countries and regions as a category of the traffic scene. The traffic scene related light distribution data base 52 records therein a transversely asymmetrical light distribution pattern. Then, the transversely asymmetrical light distribution pattern is recorded as it is and as transversely turned over for a country or region where the left-hand side traffic is adopted and a country or region where the right-hand side traffic is adopted. For example, a light distribution pattern related to a curvilinear course of a highway in France or Germany is a light distribution pattern resulting by transversely turning over a light distribution pattern (b) related to a curvilinear course of a highway in Japan or England. Namely, the light distribution pattern determination unit 51 can read out an appropriate light distribution pattern from the traffic scene related light distribution data base 52 based on information on country or region, the type of road and weather.

FIG. 5 illustrates an example of a data format of the driver's attribute related light distribution data base 53. The driver's attribute related light distribution data base 53 records therein appropriate light distribution patterns according to attributes of the driver such as age and driving experience in such a manner as to relate the appropriate light distribution patterns to the attributes of the driver. The driver's attribute related light distribution data base 53 shown in the drawing records therein light distribution patterns appropriate to ages, which is an example of the attributes of the driver in such a manner as to relate the light distribution patterns to the ages. For example, a standard light distribution pattern is related to the non-aged who are at the age of not older than sixty, and a light distribution pattern for illuminating mainly a near field at a wide angle is related to the aged who are at the age of seventy and older. In addition, a light distribution for illuminating a semi-near field at a semi-wide angle is related to drivers who are at the ages of sixty and older but not older than seventy. Alternatively, the relation between light distribution pattern and age may be made more closely progressive for a certain age and older in such a manner that the light distribution pattern becomes suited more and more to near field and wide angle illumination as the age gets older.

Figure 6:
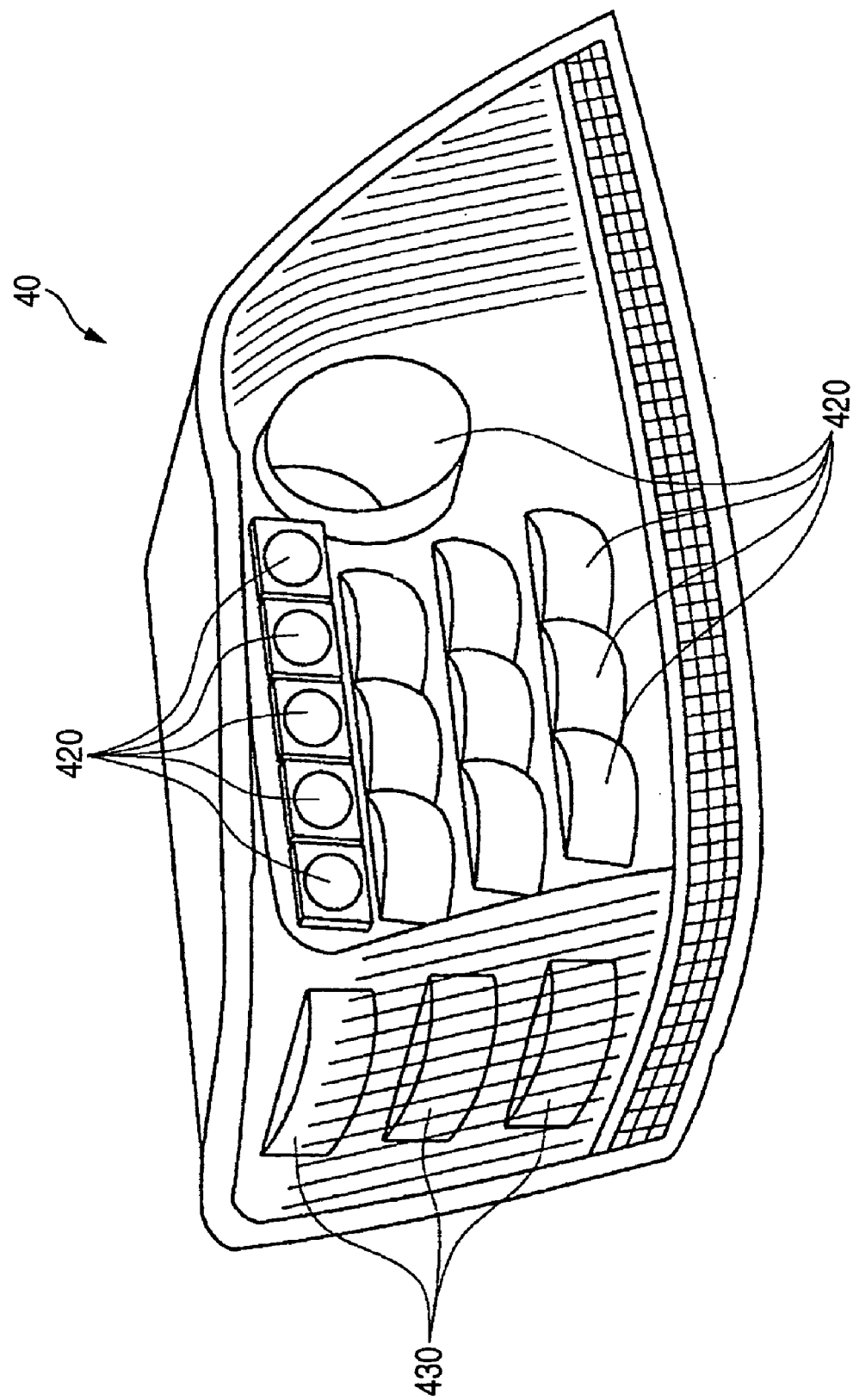
FIG. 6 is a perspective view illustrating an example of arrangement of a plurality of light sources.

FIG. 6 is a perspective view showing an example of plurality of light sources 40 disposed at the right front of the vehicle 20. The plurality of light sources 40 constitute the right headlight 420 and the right auxiliary light 430. Each of the plurality of light sources 40 is fixed in such a manner as to freely change its orientation with regard to two axes; vertically and horizontally or transversely. A gear mechanism, not shown, which is driven by, for example, a stepper motor is connected to the back of each of the plurality of light sources 40. The angle control unit 55 of the light sources control unit 50 realizes a light distribution pattern determined by the light distribution pattern determination unit 51 by controlling individually the plurality of stepper motors which drive the plurality of light sources 40. In addition, the light quantity control unit 54 realizes an appropriate light quantity distribution within the light distribution pattern determined by the light distribution pattern unit 51 by changing independently the current value of each of the plurality of light sources 40.

Figure 7:
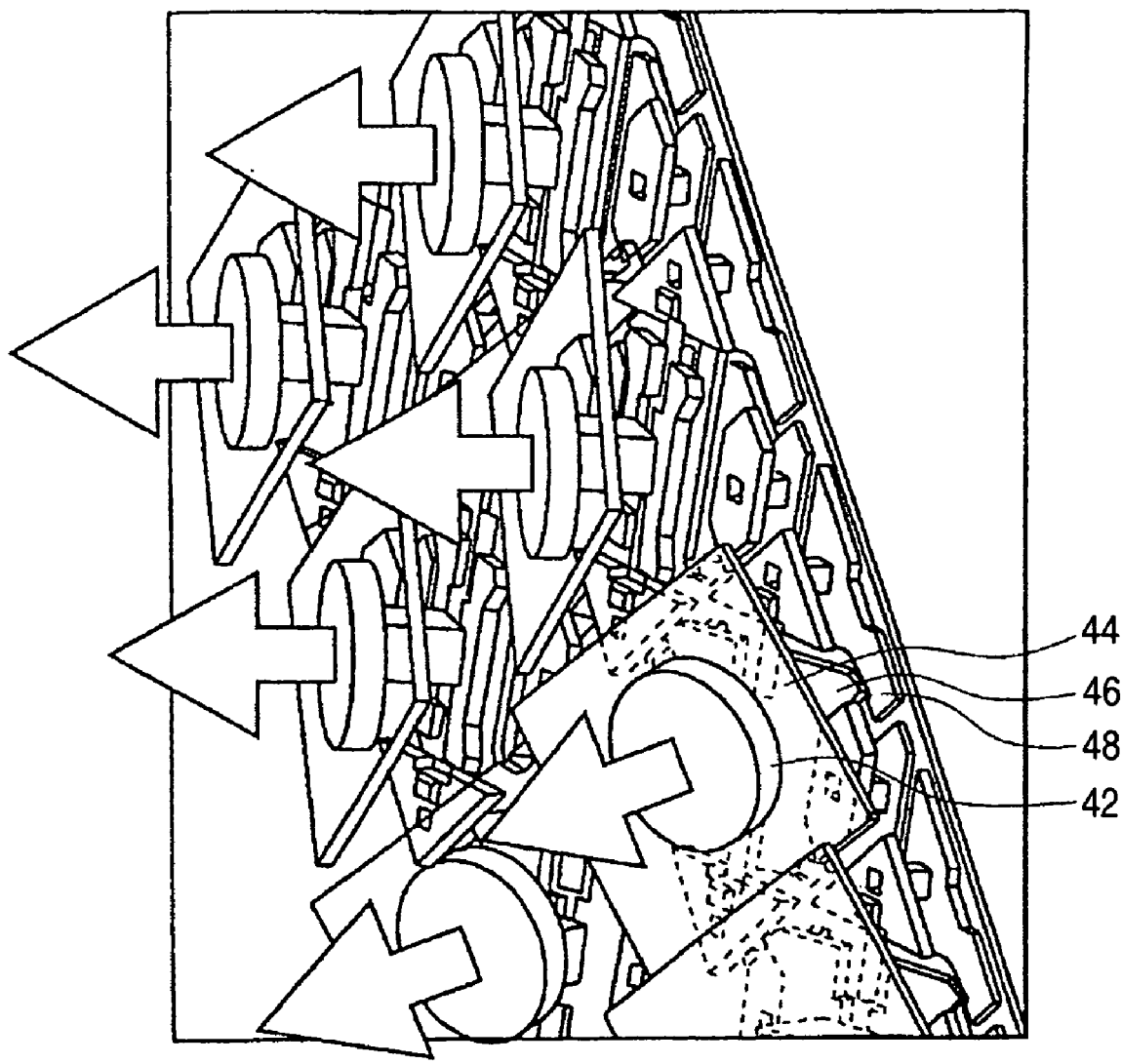
FIG. 7 is a drawing illustrating another example of a mechanism for driving the plurality of light sources.

FIG. 7 is a drawing illustrating another example of a mechanism for driving the plurality of light sources 40. The principle of DMD (Digital Micro Mirror Device) is applied to this example. Each light source 40 has an LED element 42, a substrate 44, a yoke 46 and a landing portion 48. The LED element 42 is fixed to an upper surface of the substrate 44, and the substrate 44 is fixed above the yoke 46. Each of the plurality of LED elements 42 is adapted to illuminate a different area to thereby form a predetermined light distribution pattern as a whole. The yoke 46 is pulled by the landing portion 48 to thereby be inclined through about 20°, when a predetermined voltage is applied to the landing portion 48. A feeding pattern for feeding operating power for the LED element 42 is provided on a lower surface of the substrate 44, and when the yoke 46 is inclined, an operating current for the LED element 42 is fed to the feeding pattern from the landing portion 48. Namely, the LED element 42 emits light in the direction of a normal to the substrate 44 with the substrate 44 being inclined.

A feeding pattern for feeding operating power for the LED element 42 is also provided on a side of the substrate 44 which is situated diagonally opposite to the aforesaid location of the feeding pattern. Then, when a voltage is applied to a diagonally opposite side of the landing portion 48, the yoke 46 is inclined through about 20° to an opposite side, whereby an electric current is fed to the feeding pattern provided on the diagonally opposite side of the substrate 44. As this occurs, the landing portion 48 feeds an electric current of a different magnitude to the feeding pattern disposed on the diagonally opposite side of the substrate 44, whereby the LED element 42 can be illuminated at a different brightness according to the orientation of the LED element 42. The angle control unit 55 changes the light distribution pattern by changing the orientation of each LED element 42. The light quantity control unit 54 realizes an appropriate light quantity distribution within a light distribution pattern determined by the light distribution pattern determination unit 51 by independently changing the electric power fed to each of the plurality of feeding patterns which are formed on the lower surface of the substrate 44.

Figure 8:
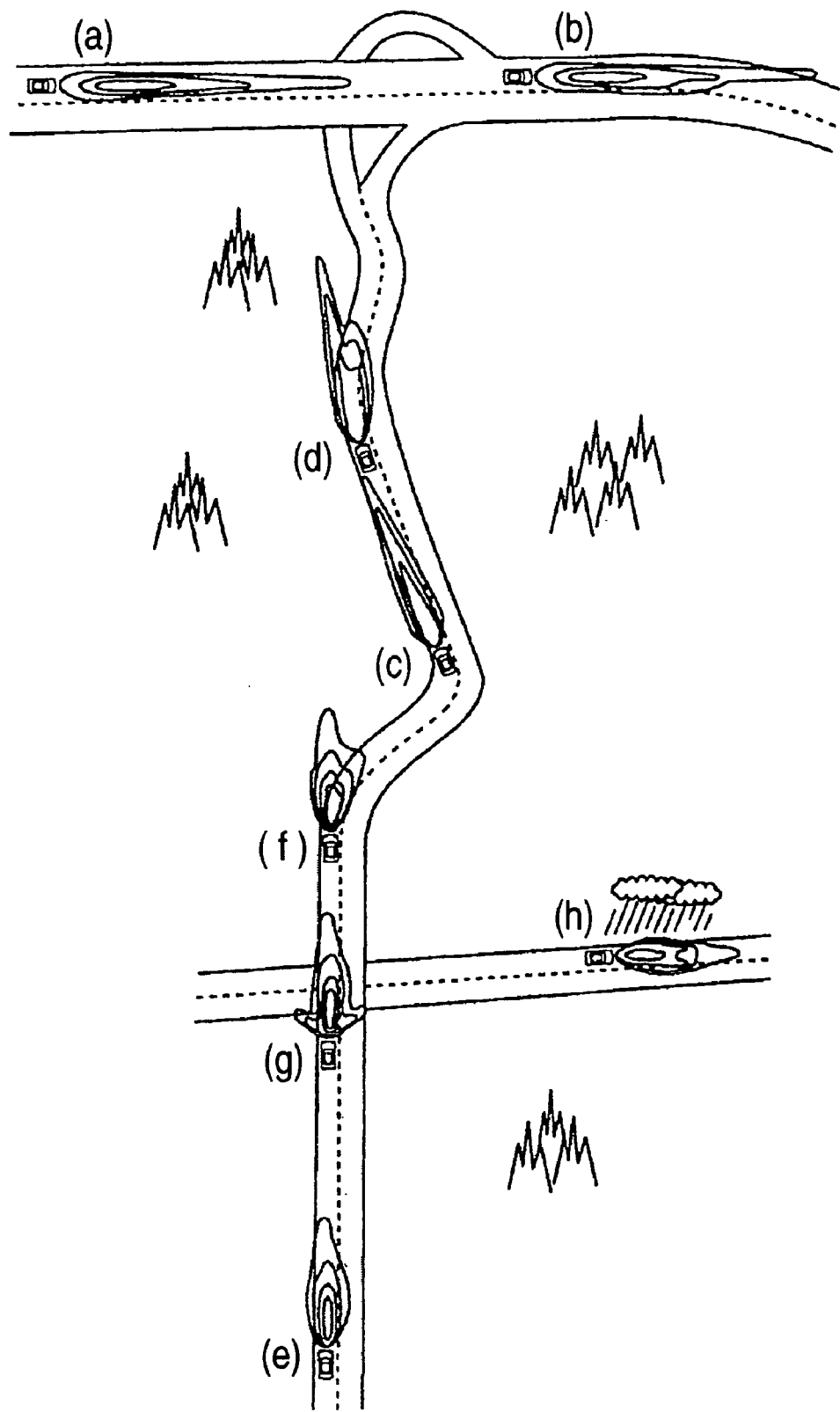
FIG. 8 is a drawing illustrating an example of light distribution control according to a traffic scene with regard to a left-hand side traffic.
Figure 9:
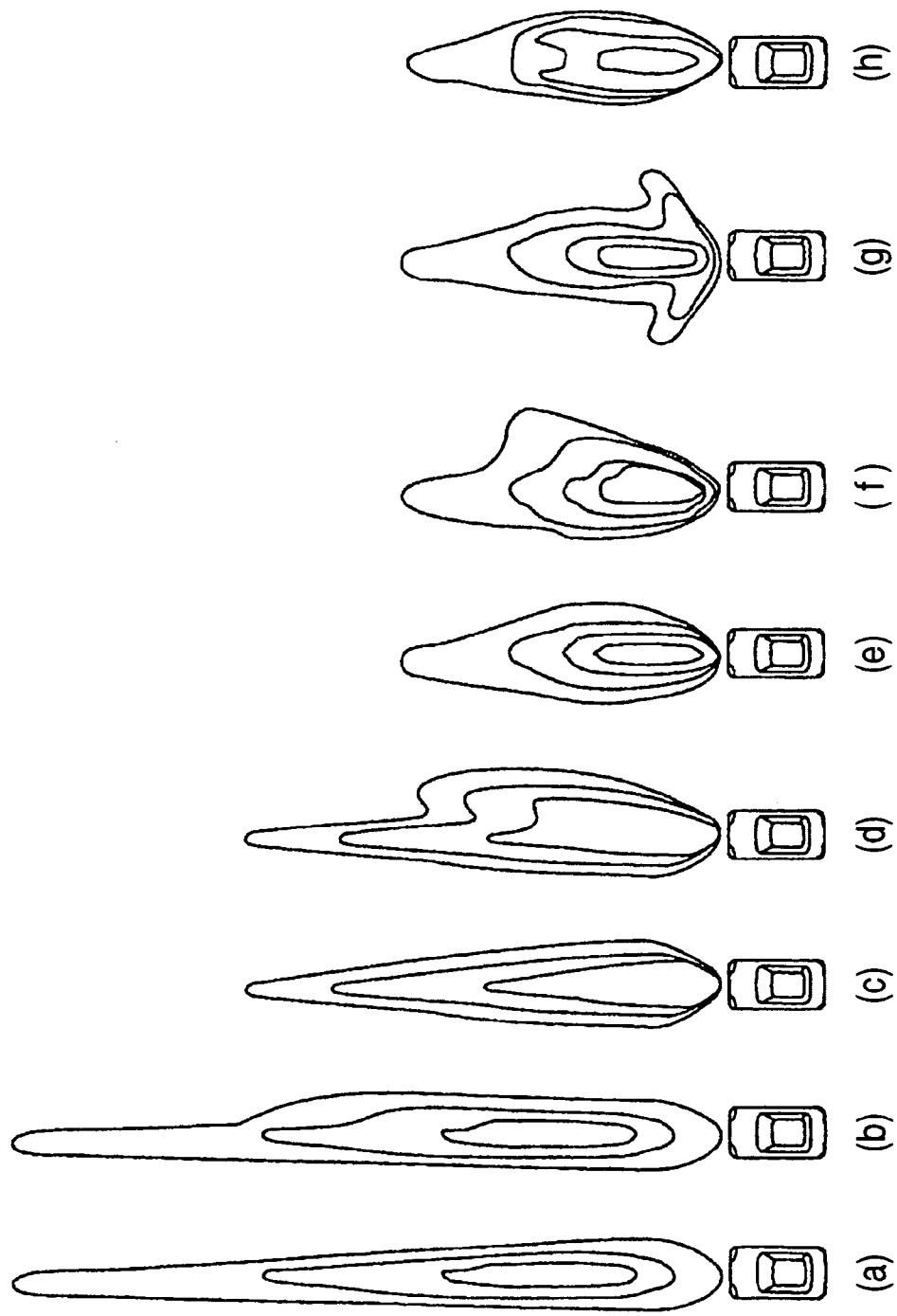
FIG. 9 is a drawing illustrating an example of light distribution control according to a traffic scene with regard to a left-hand side traffic.

FIGS. 8 and 9 are drawings illustrating examples of light distribution patterns according to traffic scenes with regard to the left-hand side traffic. Reference characters (a) to (h) in the drawings correspond to the light distribution patterns (a) to (h) in the traffic scene related light distribution data base 52 shown in FIG. 4. The light distribution patterns are set such that the orientations of the plurality of light sources 40 are caused to converge on a farther and narrower range as the vehicle speed develops in the traffic scenes. For example, a highway light distribution pattern illuminates a farthest and narrowest range concentratedly, and as light distribution patterns change to suburban and urban light distribution patterns, the orientations of the plurality of light sources 40 are caused to diverge over nearer fields in wider ranges in a progressive fashion. A curvilinear course light distribution pattern causes the orientations of part of the plurality of light sources 40 to diverge independently towards an oncoming vehicles lane, and an intersection light distribution pattern causes the orientations of part of the plurality of light sources 40 to diverge independently leftwards and rightwards. A rainy day light distribution pattern (h) darkens a nearest field by spreading intervals between the light sources 40 which are directed to the nearest field so as to prevent reflection from the road surface. Thus, since the plurality of light distribution patterns (a) to (h), which are optimized for the respective traffic scenes, are stored in the traffic scene related light distribution data base 52 in such a manner as to relate them to the traffic scenes, respectively, the light distribution pattern determination unit 51 can select an appropriate light distribution pattern to a running traffic scene obtained from the navigation unit 72. Consequently, the vehicle lighting system 30 can realize a light distribution control which corresponds momentarily to the traffic scene which is changing moment by moment.

For example, the light distribution determination unit 51 reads out the light distribution pattern (a) or (b) from the traffic scene related light distribution data base 52 when the navigation unit 72 recognizes a road on which the vehicle 20 is currently running as a high way. Then, the light distribution pattern determination unit 51 causes the orientations of the plurality of light sources 40 to diverge on a farther and narrower area than a normal road light distribution pattern for a suburban or urban road by changing independently the orientation of each of the plurality of light sources 40 according to the light distribution pattern so read out. On the other hand, in the event that the navigation unit 72 recognizes the current road as an urban road, the light distribution pattern determination unit 51 causes the orientations of the plurality of light sources 40 to diverge on a wider area than when running on a suburban road by changing independently the orientation of each of the plurality of light sources.

Figure 10:
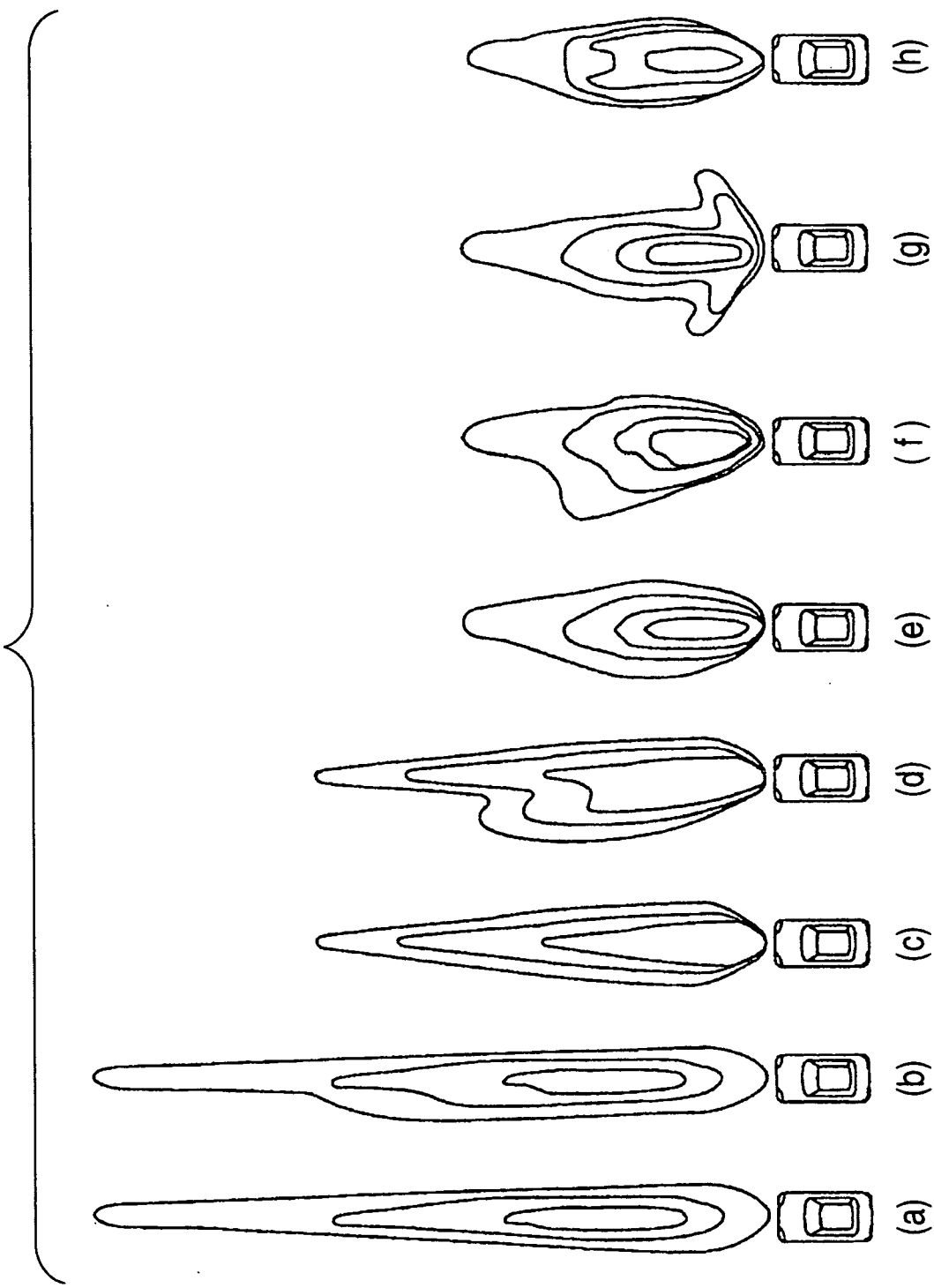
FIG. 10 is a drawing illustrating an example of light distribution control according to a traffic scene with regard to a right-hand side traffic.

FIG. 10 is a drawing illustrating an example of a light distribution control according to traffic scenes with regard to the right-hand side traffic. Light distribution patterns shown in the drawing are light distribution patterns which results from transversely turning over the light distribution patterns shown in FIG. 9. The light distribution pattern determination unit 51 obtains a country or region that has been recognized by the navigation unit 72 and reads out one of the recorded light distribution patterns which corresponds to or is related to the country or region so obtained from the traffic scene related light distribution data base 52. Then, the angle control unit 55 and the light quantity control unit 54 control the plurality of light sources 40, respectively, in order to realize the light distribution pattern according to the country or region so readout, whereby the vehicle lighting system 30 can change the light distribution patterns in such a manner as to comply with a standard for each country or region. For example, when the vehicle 20 is driven from England where the left-hand side traffic is adopted to France where the right-hand side traffic is adopted via the Euro Tunnel, the vehicle lighting system 30 can turn over the light distribution patterns transversely (the light distribution patterns can be transversely inverted) when passing the boundary between England and France.

FIGS. 11 to 16 illustrate examples of light distribution controls according to gazing point and dangerous obstacle. In the drawings, a star mark denotes a gazing point detected by the line of sight detection unit 74 or an object determined to be a dangerous obstacle by the dangerous obstacle determination unit 66. An oval surrounding the star mark denotes a hot zone (a main light distribution portion) that has a particularly high light quantity distribution in a light distribution pattern. The light sources control unit 50 obtains the direction of the line of sight of the driver from the line of sight detection unit 74 and specifies a gazing point. The dangerous obstacle detection unit 66 extracts a bicycle or a pedestrian from forward images photographed by the camera 62 through the shape matching and determines the bicycle or pedestrian so extracted to be a dangerous obstacle. When the shape matching is difficult to be performed at night, for example, the dangerous obstacle determination unit 66 extract an object dissipating heat corresponding to the bodily temperature of a pedestrian from infrared images and determines the object to be a dangerous obstacle. The radar 68 is an extremely high frequency radar for recognizing the position of a forward object under bad weather conditions such as rainy conditions. The dangerous obstacle determination unit 66 calculates the current position and migration vector of the dangerous obstacle from data obtained from the camera 62 or the radar 68. Then, the dangerous obstacle determination unit 66 obtains a course that the vehicle 20 is taking from the running control unit 78 which controls the running of the vehicle 20 and determines whether or not the dangerous obstacle is being approached on the course of the vehicle 20. Then, the dangerous obstacle determination unit 66 disregards an object as the dangerous obstacle in case the object is not being approached on the course of the vehicle 20.

The dangerous obstacle determination unit 66 may be such as to determine as a dangerous obstacle only an object among dangerous obstacles existing inside the current light distribution pattern which deviates from the line of sight of the driver that has been detected by the ling of sight detection unit 74 through a predetermined angle or greater. Namely, objects which reside inside the current light distribution pattern and which are close to the gazing point may be disregarded as dangerous obstacles, whereby such objects which have been highly possibly recognized by the driver can be disregarded as dangerous obstacles. The dangerous obstacle determination unit 66 may disregard an object whose relative speed to the vehicle 20 is a certain value or smaller as the dangerous obstacle, whereby, for example, a vehicle running ahead on the same lane at the same vehicle speed as that of the vehicle 20 can be disregarded as the dangerous obstacle. Thus, the dangerous obstacle determination unit 66 can determine whether or not the forward or leading object is dangerous to the vehicle 20 with high accuracy. The dangerous obstacle determination unit 66 informs the light sources control unit 50 of the position and type of the object determined to be a dangerous obstacle thereby.

Figure 11:
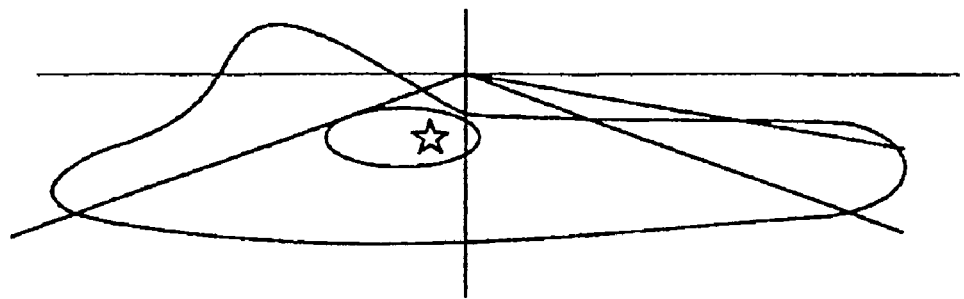
FIG. 11 is a drawing illustrating an example of light distribution control according to a gazing point or a dangerous obstacle.
Figure 12:
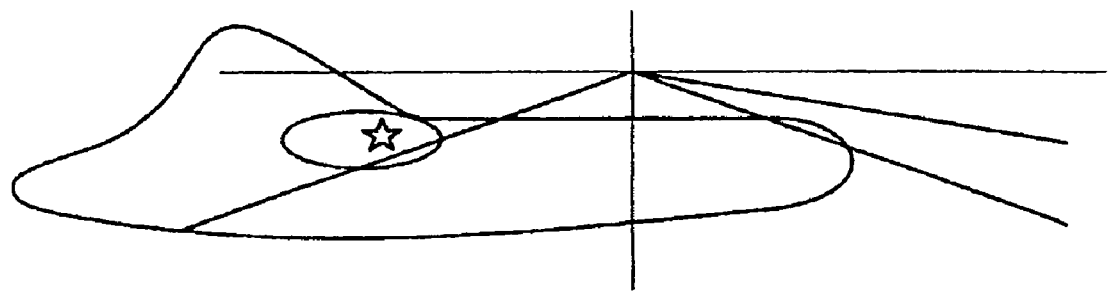
FIG. 12 is a drawing illustrating an example of light distribution control according to a gazing point or a dangerous obstacle.
Figure 13:
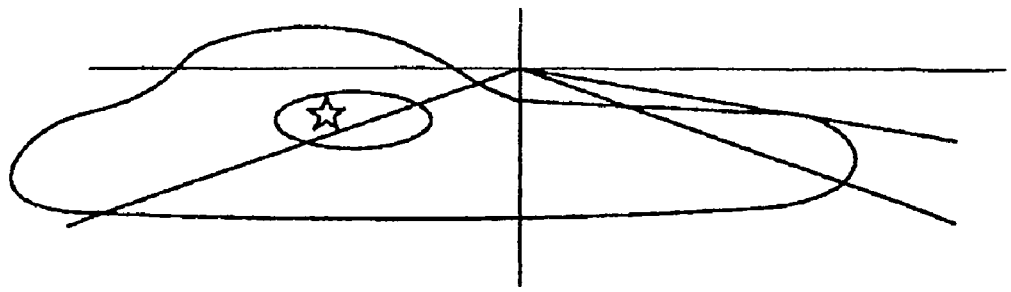
FIG. 13 is a drawing illustrating an example of light distribution control according to a gazing point or a dangerous obstacle.
Figure 14:
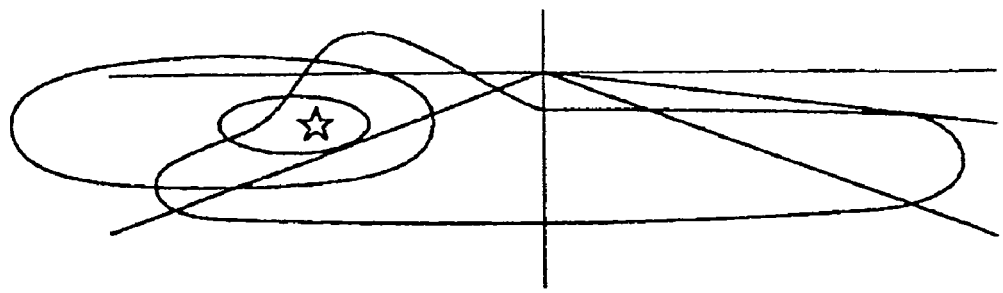
FIG. 14 is a drawing illustrating an example of light distribution control according to a gazing point or a dangerous obstacle.

FIG. 11 illustrates a light distribution pattern resulting when the driver gazes at a far field ahead of the vehicle 20. FIGS. 12, 13 and 14 illustrate examples of light distribution controls resulting when the driver's gazing point or a dangerous obstacle resides at the left front of the vehicle 20. In the event that a dangerous obstacle or the gazing point resides outside a main light distribution portion in the current light distribution pattern, the light sources control unit 50 changes at least either the orientations or the light quantity of the plurality of light sources 40 in order to illuminate the dangerous obstacle or the gazing point at a certain luminous intensity or greater. In the example shown in FIG. 12, the light sources control unit 50 inclines the angles of the plurality of light sources 40 leftwards until the main light distribution portion illuminates the gazing point or the dangerous obstacle while the contour of the light distribution pattern shown in FIG. 11 is being maintained.

In the example shown in FIG. 13, the light sources control unit 50 changes the light distribution pattern by changing, in particular, the orientation of each of the light sources 40 which illuminate a left-hand side of the light distribution pattern only by a different rotating vector. In this case, the light sources control unit 50 changes the orientations of the light sources 40 which illuminate mainly the left-hand side area of the light distribution pattern while maintaining the position of a cut-off line which regulates an upper end outline of the light distribution pattern. In the example shown in FIG. 14, the light sources control unit 50 causes the gazing point or the dangerous obstacle to be illuminated by additionally illuminating the left auxiliary light 410 without changing the orientations of the plurality of light sources 40 which form the light distribution pattern illustrated in FIG. 11.

Figure 15:
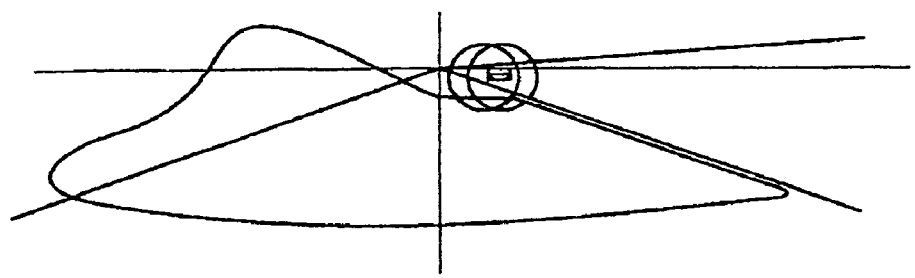
FIG. 15 is a drawing illustrating an example of light distribution control according to a gazing point or a dangerous obstacle.
Figure 16:
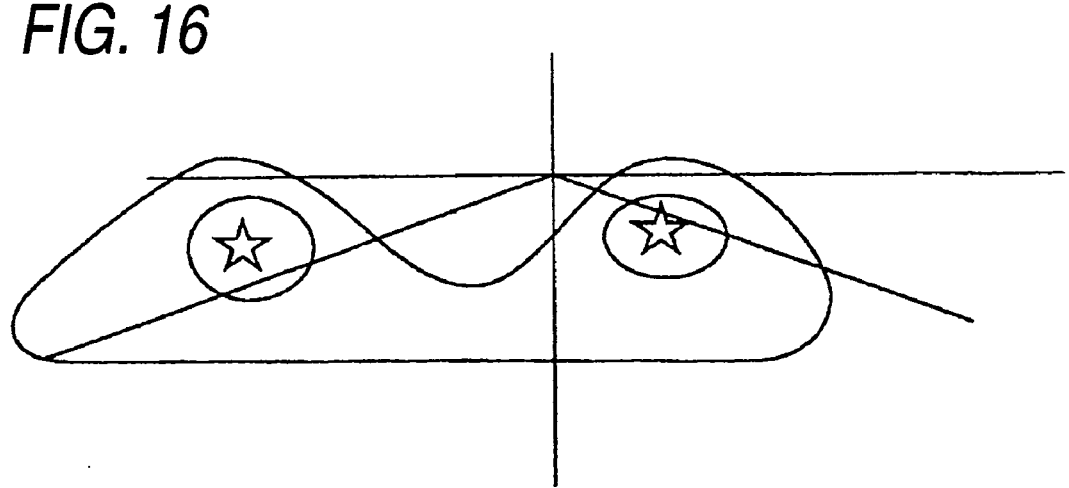
FIG. 16 is a drawing illustrating an example of light distribution control according to a gazing point or a dangerous obstacle.

FIG. 15 illustrates an example of a light distribution control to be made when an oncoming vehicle is approaching. The light sources control unit 50 detects light from the headlights of an oncoming vehicle from an image photographed by the camera 62 and reduces the brightness of the light sources 40 which are oriented to illuminate a portion of the light distribution pattern which is directed towards the oncoming vehicles lane, whereby the glare to oncoming vehicles can be reduced. FIG. 16 illustrates an example of a light distribution control resulting when there exist a plurality of dangerous obstacles. When obtaining information on a plurality of dangerous obstacles from the dangerous obstacle determination unit 66, the light sources control unit 50 reduces the quantity of light allocated to a farthest area from the plurality of dangerous obstacles of the light distribution pattern and changes at least either the orientations or the light quantities of the plurality of light sources so as to illuminate the plurality of dangerous obstacles. Note that one of the plurality of dangerous obstacles may be the gazing point. According to the light distribution control like this, in the event that there exist a plurality of directions directed towards a plurality of dangerous obstacle including a gazing point, the vehicle lighting system 30 can illuminate these directions with good efficiency.

Note that the light sources control unit 50 may control the plurality of light sources 40 in such a manner that a shoulder of the road is illuminated by at least part of the plurality of light sources 40, in the event that the light sources control unit 50 determines that the brightness on the road ahead of the traveling vehicle 20 is at a certain value or greater from an image obtained by the camera 62. Alternatively, the light sources control unit 50 may retrieve a dark area whose brightness is at a certain value or smaller from an image obtained by the camera and controls the plurality of light sources 40 in such a manner as to illuminate the relevant dark area, whereby a light distribution pattern can be realized efficiently which makes the driver feel a feeling of safety.

Figure 17:
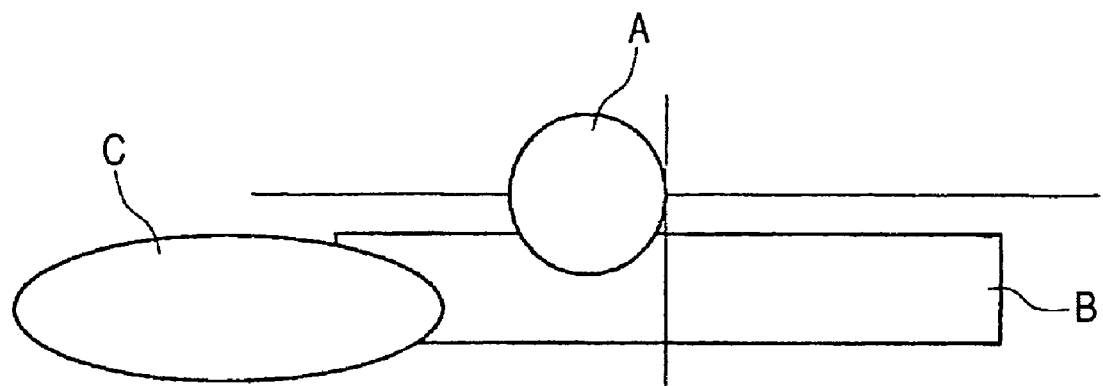
FIG. 17 is a drawing illustrating another example of light distribution control.
Figure 18:
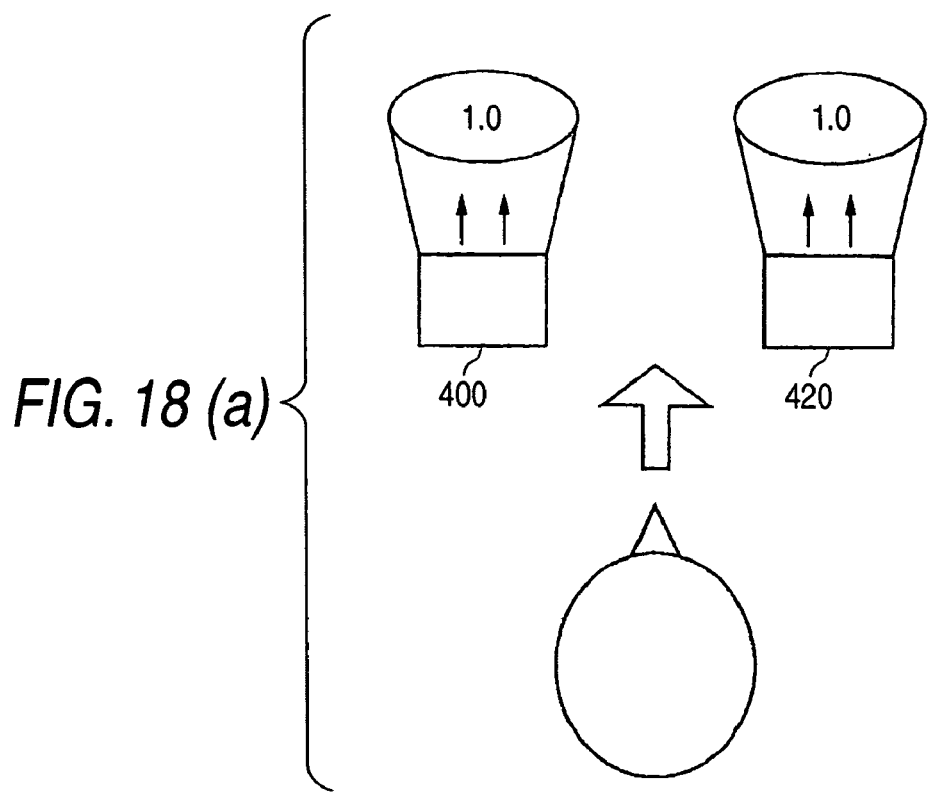
FIGS. 18A-18B are drawings illustrating a further example of light distribution control.
Figure 18:
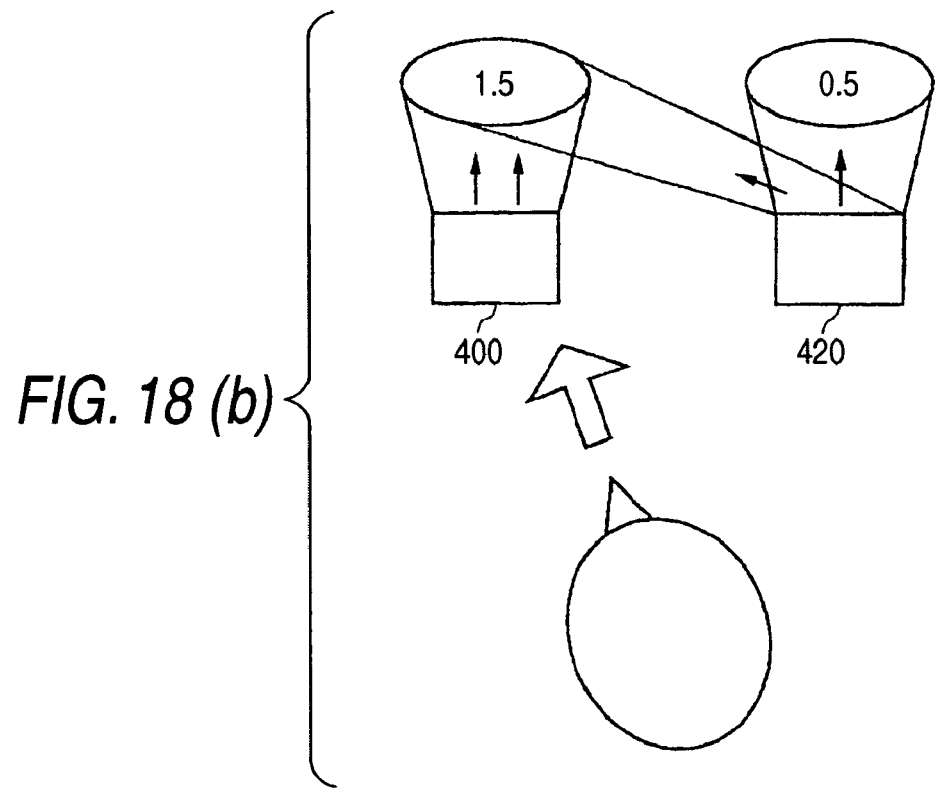
Figure 19:
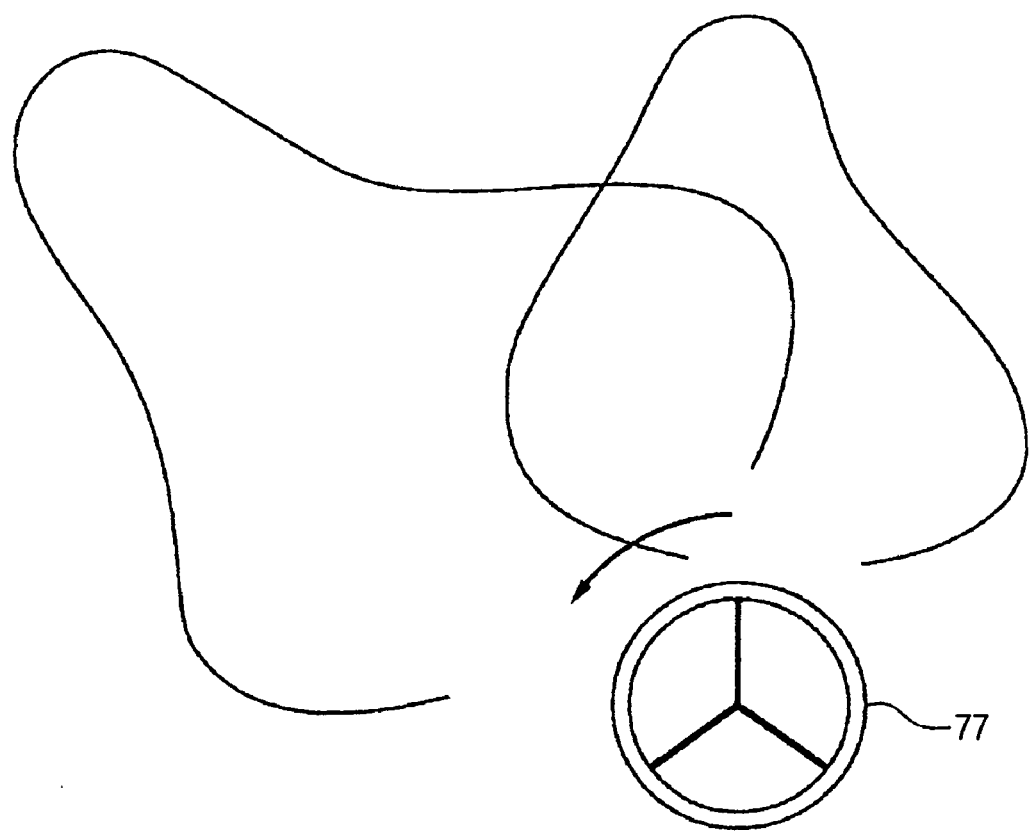
FIG. 19 is a drawing illustrating an example of light distribution control.

FIGS. 17 to 19 are drawings illustrating other examples of light distribution controls. FIG. 17 illustrates an example in which a light distribution pattern is divided into a plurality of elements, so that the resulting elements are controlled individually and independently. The plurality of elements are a hot zone A, a widely diffused area B and an additional light distribution C. In this example, the hot zone A interlocks with the rotation of the steering wheel 77. Namely, the light sources control unit 50 determines a direction in which the vehicle 20 is traveling according to a steering angle obtained from the steering angle obtaining unit 76 and changes the orientations of the light sources 40 in such a manner as to illuminate the determined direction by the hot zone A. When the vehicle 20 is traveling at a certain vehicle speed or slower, the light sources control unit 50 directs the widely diffused area B towards a line of sight that is obtained from the line of sight detection unit 74. The additional light distribution C is added in the event that the position of a dangerous obstacle or gazing point deviates transversely from the front of the vehicle 20 through a certain angle or greater. Since the additional light distribution C is used to illuminate, in particular, a near-field, an LED, which is small in size and consumes less power, is desirably used as a light source of the additional light distribution C.

FIGS. 18 and 19 illustrate an example in which a direction in which the driver wants to see is illuminated preferentially by changing the distribution of the numbers of light sources of the plurality of light sources 40 which are allocated to illuminate the left front and right front of the vehicle 20, respectively. In the example shown in FIG. 18, the light sources control unit 50 changes the distribution of the numbers of light sources of the plurality of light sources 40 which illuminate, respectively, the left front and right front of the vehicle 20 according to the gazing point of the driver. For example, in FIG. 18A, when the gazing point of the driver is located to the front of the driver or the driver gazes straight forward, the left headlight 400 and the right headlight 420 illuminate, respectively, the left front and the right front of the vehicle 20 with the same number of light sources 40 to thereby maintain a light quantity ratio of 1.0 to 1.0. Then, in FIG. 18B, when the gazing point of the driver is directed leftwards or the driver gazes leftwards, the light sources control unit 50 orients part of the plurality of light sources 40 which are contained in the right headlight 420 towards the left front of the vehicle 20, whereby the light sources control unit 50 can illuminate the left front brighter than the right front. For example, by orienting half the plurality of light sources 40 which illuminate the right front towards the left front, the brightness at the right front is reduced to 0.5, so that the brightness at the left front is increased to 1.5, whereby the left front that the driver wants to see can preferentially be illuminated.

In the example shown in FIG. 19, the light sources control unit 50 diverges or converges the illumination range of the plurality of light sources 40 according to the steering angle of the steering wheel 77. For example, when the steering wheel 77 is turned leftwards, the light sources control unit 50 obtains a steering angle from the steering angle obtaining unit 76 and changes independently the orientations of the plurality of light sources 40 towards a direction in which the steering wheel 77 is turned, whereby the illumination range of the plurality of light sources 40 is spread leftwards as shown in the drawing. Thus, the light sources control unit 50 can increase the brightness in the direction in which the driver wants to turn the vehicle 20.

Figure 20:
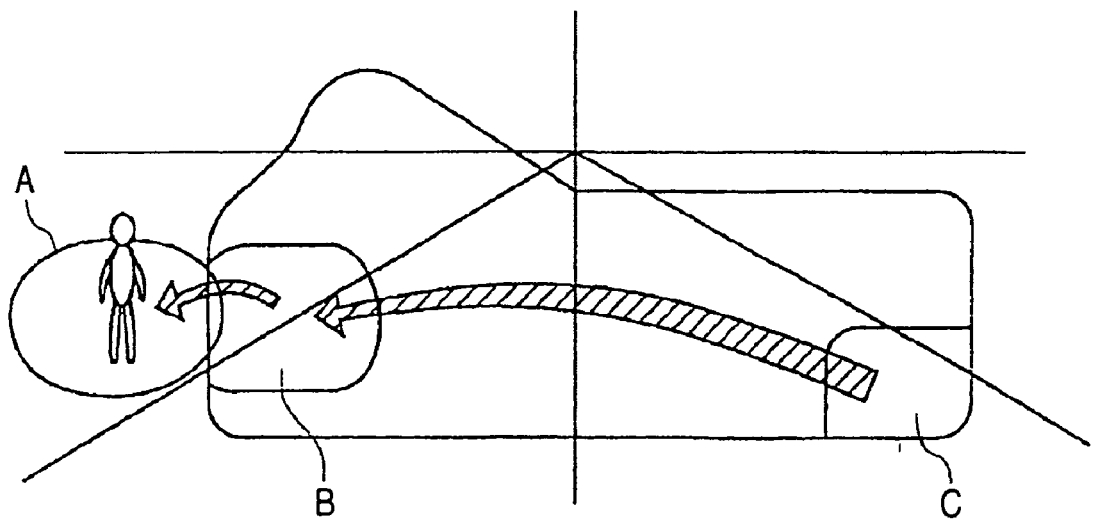
FIG. 20 is a drawing illustrating another example of light distribution control.
Figure 21:
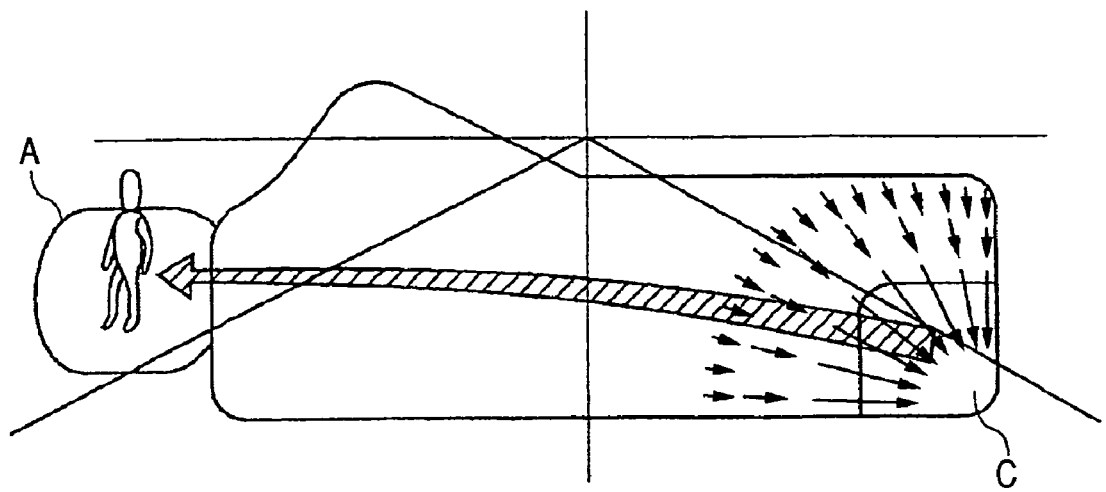
FIG. 21 is a drawing illustrating a further example of light distribution control.
Figure 22:
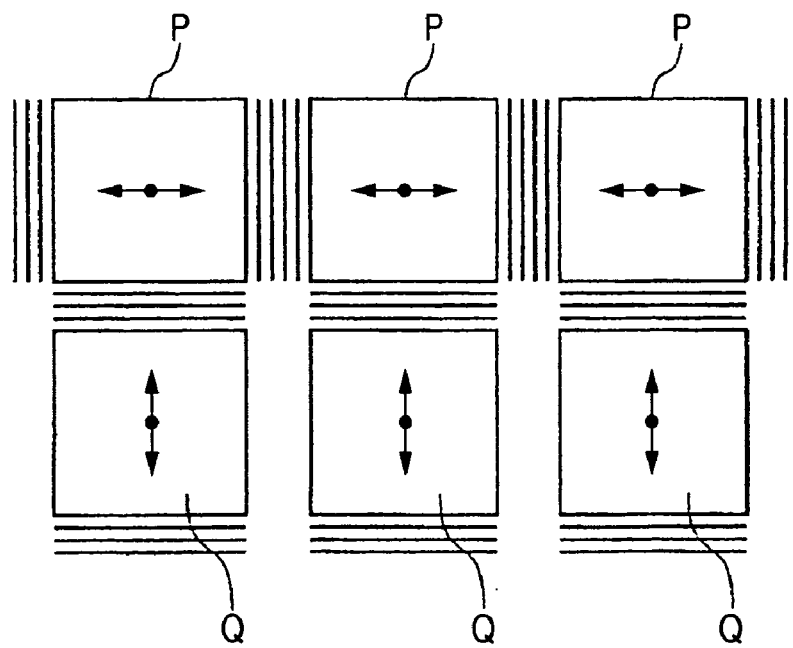
FIG. 22 is a drawing illustrating an example of reducing the irregular light distribution by the plurality of light sources.

FIGS. 21 and 22 are drawings illustrating in detail controlling operations of the light distribution pattern described with reference to FIG. 13. In an example shown in FIG. 20, the light sources control unit 50 obtains information on a pedestrian existing to the left side of the light distribution pattern as information on a dangerous obstacle from the forward conditions determination unit 60. The light sources control unit 50 causes the light sources 40, which are illuminating an area B of the light distribution pattern which is located closest to the pedestrian, to illuminate an area A containing the pedestrian. Then, the light sources control unit 50 causes the light sources 40, which are illuminating an area C of the light distribution pattern which is located farthest away from the pedestrian, to illuminate the area B. As this occurs, the contours of the other areas of the light distribution pattern are maintained. Thus, the light sources control unit 50 can illuminate the pedestrian quickly without sacrificing the brightness of the area of the light distribution pattern which is located closest to the pedestrian. As this occurs, the light sources control unit 50 changes at least either the orientations or the light quantities of the light sources 40 in such a manner as to illuminate the pedestrian, which is the dangerous obstacle, with a luminous intensity which is lower than that of the light distribution pattern. Alternatively, the light sources control unit 50 may control the plurality of light sources 40 in such a manner as to intermittently illuminate the pedestrian, which is the dangerous obstacle. In addition, when causing the light sources 40 to illuminate the pedestrian, which is the dangerous obstacle, the light sources control unit 50 changes desirably at least either the orientations or the light quantities of the plurality of light sources 40 in such a manner as to illuminate a lower part of the pedestrian than the face thereof. Alternatively, the light sources control unit 50 may control the plurality of light sources 40 in such a manner as to illuminate the pedestrian at a luminous intensity of 1000 cd or lower.

FIG. 21 is a drawing illustrating an example of a controlling operation of the light distribution pattern. In the example in the drawing, an area that has been illuminated by the light sources which now illuminate a pedestrian is illuminated by the peripheral light sources to compensate for the lack of illumination by the light sources illuminating the pedestrian.

For example, the light sources control unit 50 causes part of the light sources 40 which form the light distribution pattern to illuminate an area A including a pedestrian and maintains the light distribution pattern which had been formed before the pedestrian was recognized by changing the orientation of each of the other light sources 40 only by a different rotating vector so that the other light sources 40 are oriented towards an area C that was illuminated by the light sources 40 which are now illuminating the area A. As this occurs, the area C is desirably an area which is farthest away from the pedestrian of the light distribution pattern formed by the plurality of light sources 40. According to this operation, while maintaining the light distribution pattern in a state of what it was, the pedestrian can be illuminated without being dazzled.

FIG. 22 shows an example of an operation to reduce irregular light distribution by the plurality of light sources 40. In this examples, the light sources control unit 50 causes the light sources 40 to illuminate boundaries between adjacent illumination areas by swinging the illuminating direction of each of the plurality of light sources. According to this operation, an irregular light distribution can be reduced which tends to be generated when the plurality of light sources 40 illuminate different areas, respectively, to thereby form a predetermined light distribution pattern. A swing range of each light source 40 is preferably smaller than the pitch of an area illuminated by the relevant light source 40, and a swing direction of each light source 40 is preferably different from each other. For example, there are preferably provided areas P where the light sources 40 swing horizontally or transversely and areas Q where the light sources 40 swing vertically, whereby the irregular light distribution can be reduced both horizontally or transversely and vertically.

Figure 23:
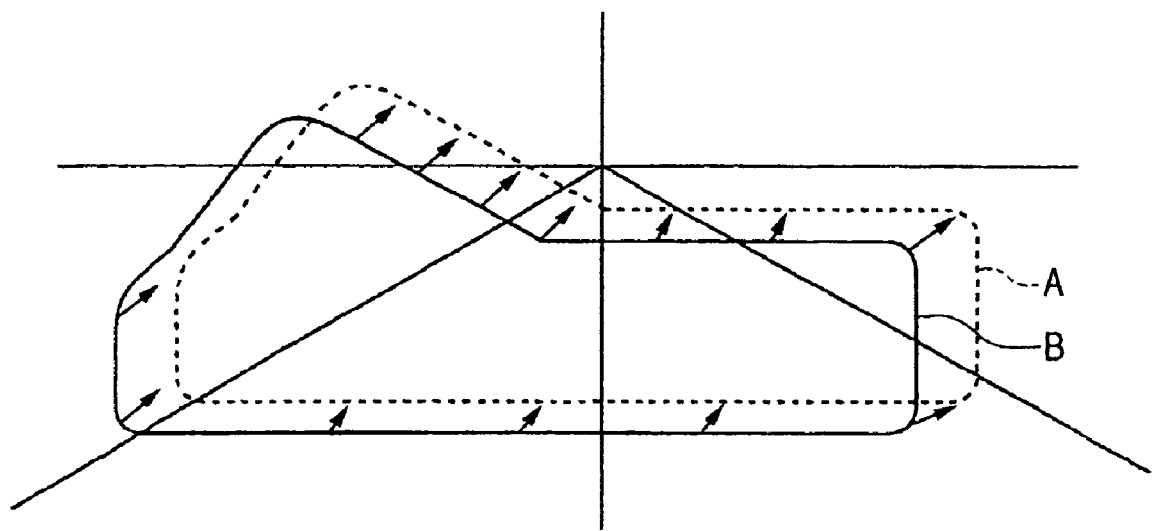
FIG. 23 is a conceptual drawing of light distribution correction.

FIG. 23 is a drawing illustrating a concept of light distribution correction. As shown in FIG. 2, the forward conditions determination unit 60 has further an actual light distribution obtaining unit 64 which obtains an actual light distribution pattern based on an image photographed by the camera 62. The light sources control unit 50 changes at least either the orientations or the light quantities of the plurality of light sources 40 so as to make the current light distribution pattern obtained by the actual light distribution obtaining unit 64 coincide with a target light distribution pattern or a light distribution pattern determined by the light distribution pattern determination unit 51. A light distribution pattern B shown in the drawing is an actual light distribution pattern obtained by the actual light distribution obtaining unit 64, and a light distribution pattern A is a light distribution pattern determined by the light distribution pattern determination unit 51. The light sources control unit 50 calculates a difference between the light distribution pattern A and the light distribution pattern B and changes independently and individually at least either the orientations or the light quantities of the plurality of light sources 40 so that the actual light distribution pattern B coincides with the target light distribution pattern A.

Figure 24:
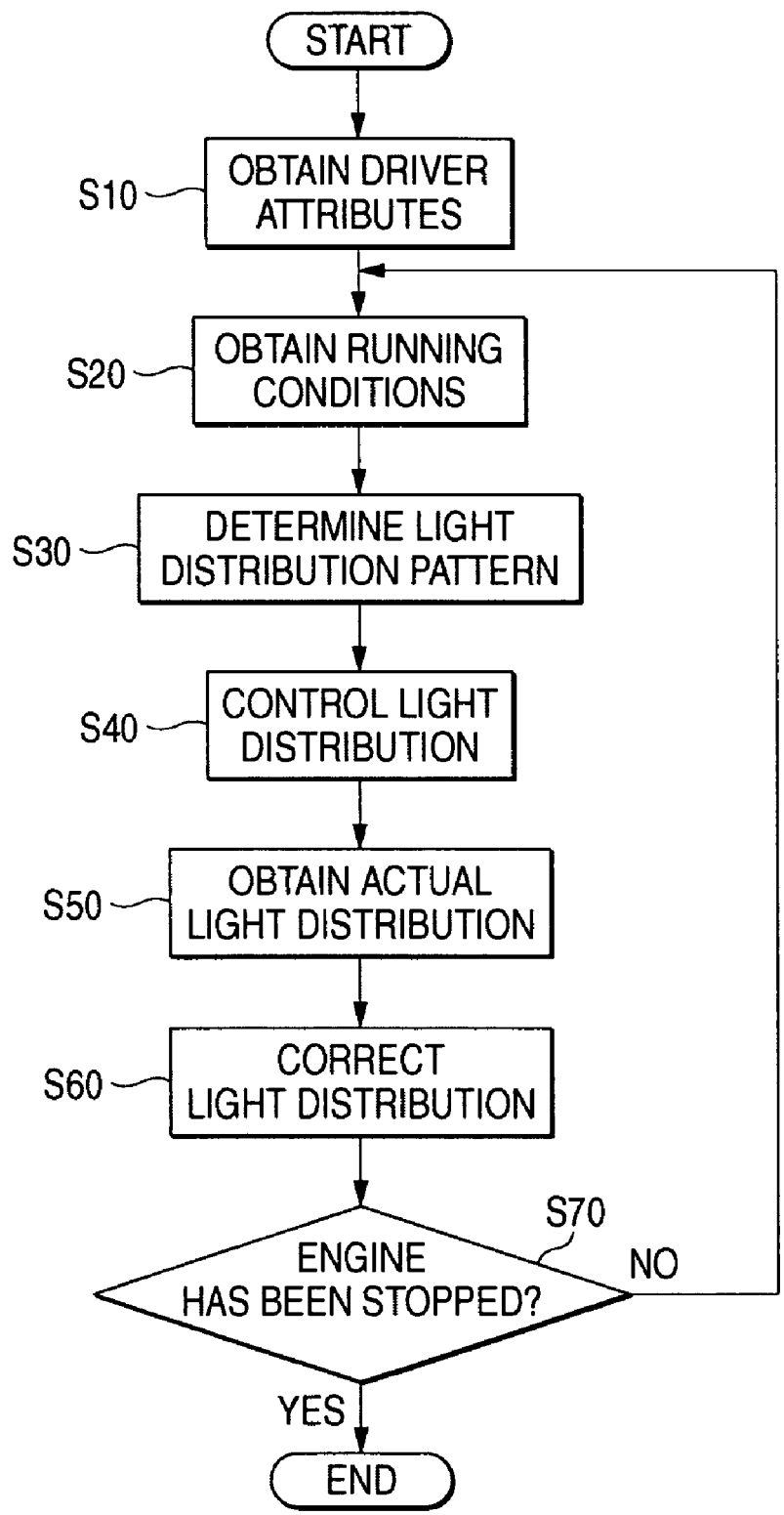
FIG. 24 is a flowchart showing a procedure of light distribution control by the vehicle lighting system.

FIG. 24 is a flowchart illustrating a procedure of light distribution control by the vehicle lighting system 30. Firstly, the driver authentication unit 70 authenticates the driver and obtains attributes of the driver such as driving license information and age information (S10). Next, the navigation unit 72, the forward conditions determination unit 60, the communication unit 80, the line of sight detection unit 74 and the steering angle obtaining unit 76 obtain running conditions of the vehicle 20 (S20). For example, the navigation unit 72 collects traffic scene information, and the forward conditions determination unit 60 and the communication unit 80 collect information on dangerous obstacles. Furthermore, the line of sight detection unit 74 detects the line of sight of the driver and the steering angle obtaining unit 76 obtains the steering angle of the steering wheel 77.

The light distribution pattern determination unit 51 determines a target light distribution pattern (S30) by referring to the traffic scene related light distribution data base 52 and the driver's attribute related light distribution data base 53 based on the attributes of the driver obtained at the step S10 and the running conditions obtained at the step S20. Then, the light quantity control unit 54 and the angle control unit 55 change independently and individually at least either the orientations or the light quantities of the plurality of light sources 40 in order to realize the light distribution pattern determined by the light distribution pattern determination unit 51 (S40). Next, the light distribution pattern determination unit 51 obtains an actual light distribution pattern from the forward conditions determination unit 60 (S50). Then, the light sources control unit 50 calculates a difference between the target light distribution pattern determined at the step S30 and the actual light distribution pattern and corrects the light distribution pattern so that the actual light distribution pattern coincides with the target light distribution pattern (S60). As this occurs, the light quantity control unit 54 and the angle control unit 55 change independently and individually at least either the orientations or the light quantities of the plurality of light sources 40. Next, the light sources control unit 50 determines whether or not the driver stops the engine (S70). If the engine is not stopped (S70:N), returning to the step S20, the light sources control unit 50 repeats the light distribution control. On the other hand, if the engine is stopped (S70:Y), this flow ends. According to the operation procedure that has been described heretofore, the vehicle lighting system 30 determines the basic light distribution pattern according to the attributes of the driver and the traffic scene and, furthermore, changes the light distribution in a real time fashion according to the forward conditions, which changes during driving, and the will of the driver, thereby making it possible to realize a light distribution which is comfortable and safe to both the driver and pedestrians.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A vehicle lighting system for illuminating ahead of a vehicle comprising:

a plurality of light sources each adapted to illuminate a different illumination area so as to form a light distribution pattern as a whole; and a control unit for controlling the light distribution pattern by independently changing an orientation of each of the plurality of light sources, wherein the control unit determines a traffic scene in which the vehicle is running and independently changes the orientation of each of the plurality of light sources so as to form a target light distribution pattern set in advance for the traffic scene.

2. The vehicle lighting system according to claim 1, wherein the control unit changes an outline of the light distribution pattern by changing the orientation of each of the plurality of light sources only by a different rotating vector.

3. The vehicle lighting system according to claim 1, further comprising:

a camera for taking a photo ahead of the vehicle, wherein the control unit determines the traffic scene from an image obtained by the camera.

4. The vehicle lighting system according to claim 1, further comprising:

a position recognition unit for recognizing a country or region as the traffic scene, wherein the control unit forms the target light distribution pattern according to a country or region obtained from the position recognition unit.

5. The vehicle lighting system according to claim 1, further comprising:

a road type recognition system for recognizing the type of a road as the traffic scene based on a current position, wherein the control unit independently changes the orientation of each of the plurality of light sources so as to cause the orientation of each of the plurality of light sources to converge on a farther and narrower area than when running on a normal road, in the event that the type of the road obtained from the road type recognition unit indicates a highway.

6. The vehicle lighting system according to claim 1, further comprising:

a road type recognition system for recognizing the type of a road as the traffic scene based on a current position, wherein the control unit independently changes the orientation of each of the plurality of light sources so as to cause the orientation of each of the plurality of light sources to diverge towards a wider area than when running on a suburban road, in the event that the road type recognition unit recognizes the current road as an urban road.

7. The vehicle lighting system according to claim 1, further comprising:
a camera for taking a photo ahead of the vehicle,
wherein the control unit obtains an actual light distribution pattern from an image photo-graphed by the camera and then causes the actual light distribution pattern to coincide with the target light distribution pattern by changing the orientation of the plurality of light sources.

8. The vehicle lighting system according to claim 1, wherein the control unit swings the illuminating direction of each of the plurality of light sources, so that a boundary between adjacent illumination areas is illuminated.

9. The vehicle lighting system according to claim 1, wherein each of the plurality of light sources comprises a LED element.

10. A vehicle lighting system for illuminating ahead of a vehicle comprising:
a plurality of light sources each adapted to illuminate a different illumination area so as to form a light distribution pattern as a whole;
a control unit for controlling the light distribution pattern by independently changing an orientation of each of the plurality of light sources; and
a camera for taking a photo ahead of the vehicle,
wherein the control unit determines the brightness on the road on which the vehicle is traveling ahead from an image obtained by the camera, so that a shoulder of the road is then illuminated by at least part of the plurality of light sources, in the event that the control unit determines that the brightness on the road is at a predetermined value or greater.

11. The vehicle lighting system according to claim 10, wherein the control unit swings the illuminating direction of each of the plurality of light sources, so that a boundary between adjacent illumination areas is illuminated.

12. The vehicle lighting system according to claim 10, wherein each of the plurality of light sources comprises a LED element.

13. A vehicle lighting system for illuminating ahead of a vehicle comprising:
a plurality of light sources each adapted to illuminate a different illumination area so as to form a light distribution pattern as a whole;
a control unit for controlling the light distribution pattern by independently changing an orientation of each of the plurality of light sources; and
a camera for taking a photo ahead of the vehicle,
wherein the control unit detects a dark area whose brightness is at a value or smaller from an image obtained by the camera, so that the dark area is illuminated by at least part of the plurality of light sources.

14. The vehicle lighting system according to claim 13, wherein the control unit swings the illuminating direction of each of the plurality of light sources, so that a boundary between adjacent illumination areas is illuminated.

15. The vehicle lighting system according to claim 13, wherein each of the plurality of light sources comprises a LED element.

* * * * *